United States Patent [19]
Yoshida et al.

[11] Patent Number: 5,916,252
[45] Date of Patent: Jun. 29, 1999

[54] REFRIGERATING OR AIR-CONDITIONING APPARATUS

[75] Inventors: Yuji Yoshida, Itami; Mitsuharu Matsuo, Ibaraki; Takaji Akiya, Tsuchiura; Masaru Owa, Tsukuba; Masataka Ozeki, Izumi, all of Japan

[73] Assignee: Matsushita Electric Industrial Co., Ltd., Osaka, Japan

[21] Appl. No.: 08/960,052

[22] Filed: Oct. 29, 1997

[51] Int. Cl.⁶ ........................................ F25B 41/00
[52] U.S. Cl. ........................... 62/204; 62/212; 62/225; 62/228.3; 62/228.4; 62/502
[58] Field of Search ............... 62/224, 225, 228.1, 62/228.3, 228.4, 228.5, 114, 502, 85, 474, 203, 204, 208, 209, 210, 212

[56] References Cited

U.S. PATENT DOCUMENTS

| | | | |
|---|---|---|---|
| 5,241,833 | 9/1993 | Ohkoshi | 62/204 X |
| 5,253,483 | 10/1993 | Powell et al. | 62/209 X |
| 5,502,970 | 4/1996 | Rajendran | 62/212 X |
| 5,623,834 | 4/1997 | Bahel et al. | 62/224 X |

FOREIGN PATENT DOCUMENTS

93/04139  3/1993  WIPO .

OTHER PUBLICATIONS

T. Akiya et al., "Formation Conditions of Clathrates Between HFC Alternative Refrigerants and Water", *Thirteenth Symposium on Thermophysical Properties*, (Jun. 1997).

"Water A Comprehensive Treatise—vol. 2 Water Crystalline Hydrates Aqueous Solutions of Simple Nonelectrolytes", Plenum Press, pp. 122–128, 1973.

*Primary Examiner*—Harry B. Tanner
*Attorney, Agent, or Firm*—Ratner & Prestia

[57] ABSTRACT

Disclosed is a refrigeration or air conditioning system comprising a refrigeration cycle that uses a refrigerant mixture of at least two kinds of refrigerants consisting of 45 to 55 weight percent of R32 and 55 to 45 weight percent of R125, and that includes at least a compressor, a condenser, a throttling device, and an evaporator. In some cases the temperature and pressure in a line leading from the inlet of the evaporator to the suction port of the compressor is controlled below a specific temperature and pressure point corresponding to the critical decomposition point of a clathrate that contains water as a host solution and the refrigerant mixture as guest molecules, and within a prescribed control range bounded by a formation limit line of the clathrate and a saturated liquid pressure line representing the pressure versus temperature relationship of saturated liquid of the refrigerant mixture (a first control mode), and a dryer for moisture removal is provided in the refrigeration cycle.

25 Claims, 5 Drawing Sheets

REFRIGERATING OR AIR-CONDITIONING APPARATUS

BACKGROUND OF THE INVENTION

1. Field of the Invention

The present invention relates to a refrigeration or air conditioning system that uses a refrigerant alternative to R22.

2. Related Art

It is becoming more desirable that the working mediums in recently developed refrigeration equipment consisting of a compressor, a condenser, a throttling device, an evaporator, an accumulator, etc. be changed from the traditional chloroflurocarbon (CFC) and hydrochlorofluorocarbon (HCFC) refrigerants, which are said to have harmful effects on the ozone layer, to hydrofluorocarbon (HFC) refrigerants which are alternative refrigerants claimed to pose no threats to the ozone layer.

Especially, the working medium in air conditioning, refrigerant mixtures consisting of an HFC refrigerant R32 (difluoromethane, $CH_2F_2$ boiling point $-51.66°$ C.) and an HFC refrigerant R125 (pentafluoroethane, $CF_3-CHF_2$, boiling point $-48.14°$ C.) have been drawing attention as potential substitutes for R22, an HCFC refrigerant. A refrigerant mixture consisting of 50±-2 weight percent of R32 and 50±-2 weight percent of R125 is called R410A and is treated as if it were a single refrigerant.

Historically, when a refrigeration cycle system containing R410A was operated, there occurred the problem that the refrigerant reacted with a small amount of water in the refrigeration cycle system, forming a clathrate (sometimes called an enclosure compound or hydrate) which froze the line from the evaporator outlet through to the compressor suction line. In particular, if the small oil return port provided on the accumulator is frozen, the oil will not circulate into the compressor, and reliability will be seriously affected.

The clathrate here is defined as "a substance in which atoms or molecules are trapped in appropriately sized holes in a three-dimensional structure formed from other atoms or molecules bonded together, thus forming a particular crystal structure." Host solution is a substance that forms the skeleton of the three-dimensional structure, and usually water acts as the host solution. Guest molecules fill the inside of the skeleton and stabilize the ice structure of the clathrate, making its formation possible at temperatures much higher than the freezing point of water (0° C.). The clathrate structure usually depends on the size of the guest molecules, but its formation condition (temperature and pressure) and extinction condition (critical decomposition point) differ among individual guest molecules.

WO patent specification No. 93/04139 discloses that R32 and R125 create clathrates, but does not clarify the formation conditions of the clathrates created from R32 and R125 as single refrigerants or as a refrigerant mixture.

For the clathrates formed from water and R32, reference can be made to Table 1 on page 123 in Felix Franks, "Water—A Comprehensive Treatise," Plenum Press (1973) which discloses that the critical decomposition temperature is 17.6° C., but no mention is made there of the critical decomposition pressure or the formation condition (temperature and pressure).

On the other hand, regarding the clathrates formed from water and R125, no examples relating to the their formation have been found, let alone examples disclosing the formation and extinction conditions for R32/R125 refrigerant mixture.

SUMMARY OF THE INVENTION

It is an object of the present invention to clarify the formation condition (temperature and pressure) and extinction condition (critical decomposition point) for a clathrate containing water as the host solution and a refrigerant mixture consisting of 45 to 55 weight percent of R32 and 55 to 45 weight percent of R125 as the guest molecules, and to provide a refrigeration or air conditioning system wherein the possibility of clathrate-induced trouble during operation is eliminated.

It is another object of the present invention to provide a refrigeration or air conditioning system wherein provisions are made to readily prevent the formation of a clathrate in order to eliminate the possibility of clathrate-induced trouble during operation.

To resolve the above-mentioned problems, according to claim 1 of the present invention, there is provided a refrigeration or air conditioning system comprising a refrigeration cycle that uses a refrigerant mixture of at least two kinds of refrigerants consisting of 45 to 55 weight percent of R32 and 55 to 45 weight percent of R125, and that includes at least a compressor, a condenser, a throttling device, and an evaporator, wherein in some cases temperature and pressure in a line leading from an inlet of the evaporator to a suction port of the compressor is controlled below a specific temperature and pressure point corresponding to the critical decomposition point of a clathrate that contains water as a host solution and the refrigerant mixture as guest molecules, and within a prescribed control range bounded by a formation limit line of the clathrate and a saturated liquid pressure line representing the pressure versus temperature relationship of saturated liquid of the refrigerant mixture (a first control mode), and a dryer f or moisture removal is provided in the refrigeration cycle.

Further, there is provided a refrigeration or air conditioning system comprising a refrigeration cycle that uses a refrigerant mixture of at least two kinds of refrigerants consisting of 45 to 55 weight percent of R32 and 55 to 45 weight percent of R125, and that includes at least a compressor, a condenser, a throttling device, and an evaporator, wherein temperature and pressure in a line leading from an inlet of the evaporator to a suction port of the compressor is controlled below a specific temperature and pressure point corresponding to the critical decomposition point of a clathrate that contains water as a host solution and the refrigerant mixture as guest molecules, and within a prescribed control range bounded by a formation limit line of the clathrate and a saturated liquid pressure line representing the pressure versus temperature relationship of saturated liquid of the refrigerant mixture (a second control mode), and a dryer for moisture removal is provided in the refrigeration cycle.

The boiling points of R32 and R125 shown here are both below 0° C., and the vapor pressure of the clathrate (above 0° C.) formed from water and R32/R125 refrigerant mixture is higher than the atmospheric pressure. R410A is a refrigerant mixture consisting of 50±2 weight percent of R32 and 50=2 weight percent of R125, but it has become evident that the critical decomposition point remains substantially the same even in the case of the refrigerant mixture consisting of 45 to 55 weight percent of R32 and 55 to 45 weight percent of R125 where the compositional proportion of each constituent is varied by ±5 percent.

Therefore, even when the vapor pressure is controlled below the critical decomposition pressure of R32/R125 refrigerant mixture and the compressor suction temperature below the critical decomposition temperature of R32/R125 refrigerant mixture, and the temperature and pressure are together controlled to fall within the temperature range bounded by the clathrate formation limit line and the saturated liquid pressure line of R32/R125 refrigerant mixture, or even when the temperature and pressure temporarily fall within such a temperature control range, if the dryer is installed, the water that acts as the host solution is removed by adsorption, preventing the formation of the clathrate in the line leading from the outlet of the evaporator to the suction port of the compressor where the vaporized refrigerant tends to be superheated.

According to the present invention, the refrigeration or air conditioning system includes, in addition to the first or second control mode, a third control mode in which the temperature and pressure in the line leading from the outlet of the evaporator to the suction port of the compressor are controlled together so that the clathrate, containing water as the host solution and the refrigerant mixture as the guest molecules, is not formed, and so the refrigerant stays only in a vapor state throughout that line.

Further, the refrigeration or air conditioning system is adapted so that the control mode can be switched between the first or second control mode and the third control mode.

In these aspects of the invention, in the third control mode the degree of superheating is controlled above a certain value so that the compressor suction pressure and compressor suction temperature are brought outside the clathrate formation range bounded by the saturated liquid pressure line of the refrigerant and the clathrate formation limit line, thus preventing the formation of the clathrate and allowing the water that acts as the host solution to be removed by adsorption in the dryer. In this way, the water, which becomes very difficult to remove once the clathrate is formed, can be quickly removed by adsorption.

Furthermore, the refrigeration or air conditioning system is operated in the third control mode at the start of operation, after which the system is run for normal operation in the first or second control mode.

Accordingly, by performing the third control mode, the small oil return port provided on the accumulator is prevented from freezing, and the small amount of water is quickly removed by adsorption on the synthetic zeolite contained in the dryer. Thereafter, in the first or second control mode, the water which is further reduced in amount continues to be removed by adsorption on the synthetic zeolite in the dryer. As a result, even when the pressure and temperature near the small oil return port provided on the accumulator enter the clathrate formation range, the small oil return port provided on the accumulator does not freeze because more than a certain amount of water is necessary for the formation of the clathrate.

DESCRIPTION OF THE REFERENCE NUMERALS

1. INVERTER, 2. COMPRESSOR, 3. CONDENSER, 4. SYNTHETIC ZEOLITE, 5. DRYER, 6. EXPANSION VALVE, 7. EVAPORATOR, 8. OIL RETURN PORT, 9. ACCUMULATOR, 10 PRESSURE SENSOR, 11. TEMPERATURE SENSOR, 12. CONTROL UNIT

PREFERRED EMBODIMENTS OF THE INVENTION

The preferred embodiments of the present invention will be described below with reference to the accompanying drawings.

First, a detailed description will be given of the clathrate.

A vessel was placed in a cooled constant temperature chamber, and water was filled into the vessel until only a small space was left in the upper interior part of the vessel; then, after evacuating the vessel, R32/R125 refrigerant mixture was mixed therein and the formation of a clathrate was confirmed. A cylinder containing a mixture of R32/R125 in proportions of 50/50 weight percentage (this mixture is called R410A) was prepared, and R32/R125 refrigerant mixture was introduced into the vessel from the liquid side. R32/R125 refrigerant mixture is a pseudoazeotropic refrigerant mixture. Though the saturated liquid pressure at a constant temperature becomes slightly higher than the saturated vapor pressure, it can be said that the saturated liquid pressure line is substantially equal to the saturated vapor pressure line. When the temperature of the constant temperature chamber was raised while monitoring the temperature, the clathrate of water and 50/50 weight percent of R32/R125 refrigerant mixture (R410A) disappeared at a point where the temperature was 19.76° C. and the pressure 1.430 MPa (the critical decomposition point). This temperature and pressure relationship substantially agrees with the saturated liquid pressure line for 50/50 weight percent of R32/R125 refrigerant mixture (R410A).

Figure 1:
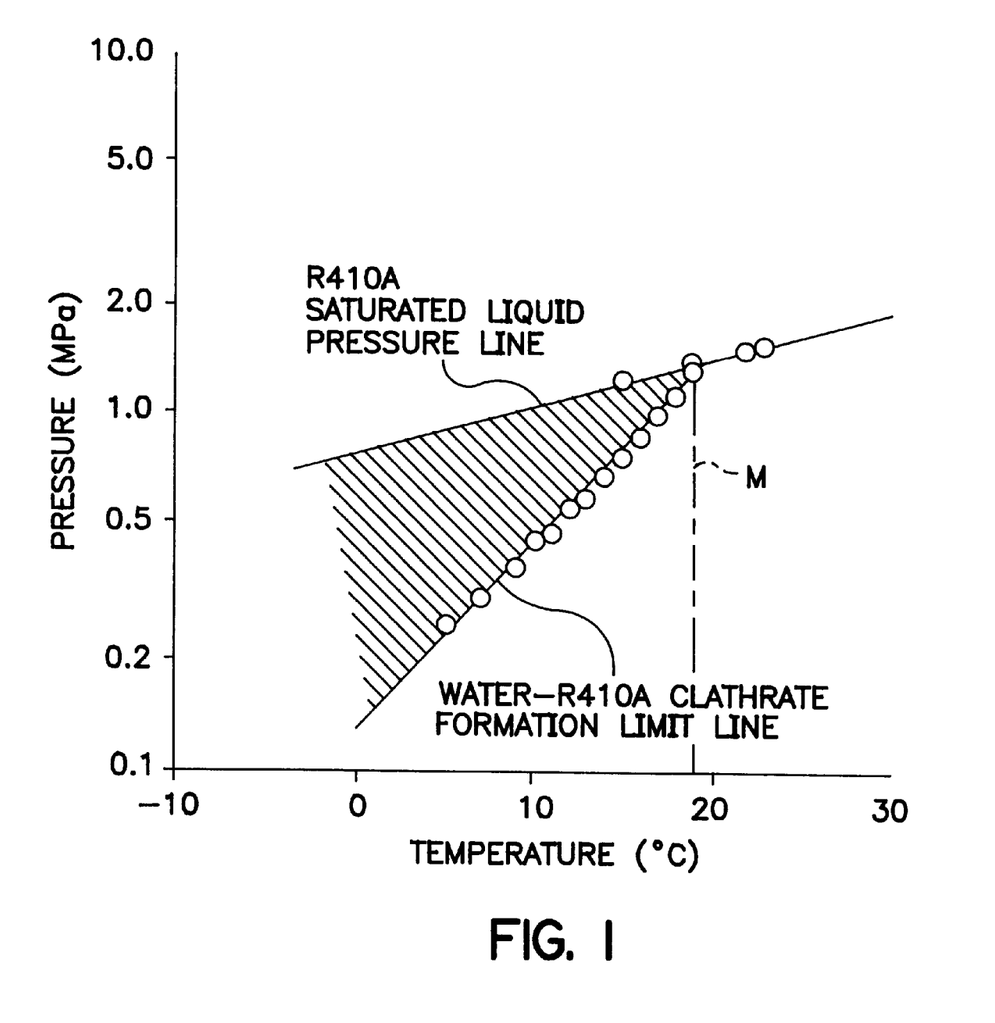
FIG. 1 is a coordinate diagram showing conditions for the formation of a clathrate of water and R32/R125 refrigerant mixture (R410A) according to a preferred embodiment of the present invention.

Points marked 0 in FIG. 1 indicate measurement points taken substantially along the clathrate formation limit measured. Of these measurement points, the measurement point of the clathrate where the pressure of 50/50 weight percent of R32/R125 refrigerant mixture (R410A) was the lowest was the point where the temperature was 5.16° C. and the pressure 0.255 MPa. In FIG. 1, the vertical axis represents the pressure plotted on a logarithmic scale, and the horizontal axis represents the temperature. The hatched area bounded by two straight lines substantially corresponds to the clathrate formation range. The upper line substantially agrees with the saturated liquid pressure line 50/50 weight percent of R32/R125 refrigerant mixture (R410A), and the lower line, which is drawn by joining the measurement points where the temperature is the highest at constant pressure, represents the formation limit line of the clathrate of water and 50/50 weight percent of R32/R125 refrigerant mixture (R410A). The hatched area corresponds to a range of temperatures (superheating) higher than the saturated liquid temperature of 50/50 weight percent of R32/R125 refrigerant mixture (R410A) at constant pressure. For example, when the saturated liquid temperature of 50/50 weight percent of R32/R125 refrigerant mixture (R410A) is 0° C. (at this time, the saturated liquid pressure is 0.806 MPa), the formation of a clathrate can occur in the range up to a point where the degree of superheating is about +15 K. The critical decomposition temperature, the upper limit temperature at the intersection of the two lines, is 19.76° C., which is much higher than 0° C. Therefore, beyond that temperature, the formation of a clathrate does not occur at any pressure.

The above R410A is a refrigerant mixture consisting of 50±2 weight percent of R32 and 50±2 weight percent of R125, but even in the case of a refrigerant mixture consisting of 45 to 55 weight percent of R32 and 55 to 45 percent of R125 where the compositional proportion of each constituent was varied by 5 percent, the critical decomposition point was found to remain substantially unchanged. Furthermore, it was found by experiment that the clathrate formation limit line also remained substantially unchanged.

Figure 2:
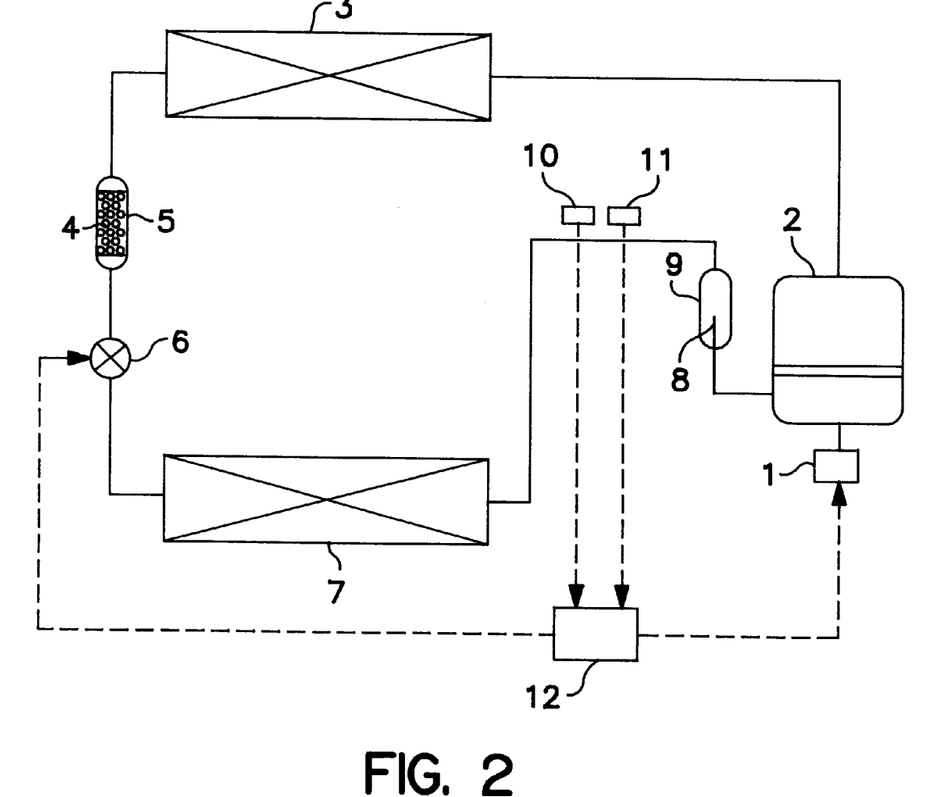
FIG. 2 is a diagram showing the configuration of a refrigeration cycle system according to a preferred embodiment of the present invention.

FIG. 2 shows a refrigeration cycle of air conditioning system that uses a refrigerant mixture consisting of 45 to 55 weight percent of R32 and 55 to 45 percent of R125. This refrigeration cycle comprises: a vapor compression refrigeration cycle consisting essentially of a compressor 2 driven by an inverter 1, a condenser 3, a dryer 5 filled with a synthetic zeolite 4 or the like, an expansion valve 6, an evaporator 7, and an accumulator 9 equipped with a small oil return port 8; a pressure sensor 10 and a temperature sensor 11 mounted near the accumulator 9; the inverter 1; and a control unit 12 for the expansion valve 6. The refrigeration cycle system may sometimes contain a small amount of unwanted water.

Figure 3:
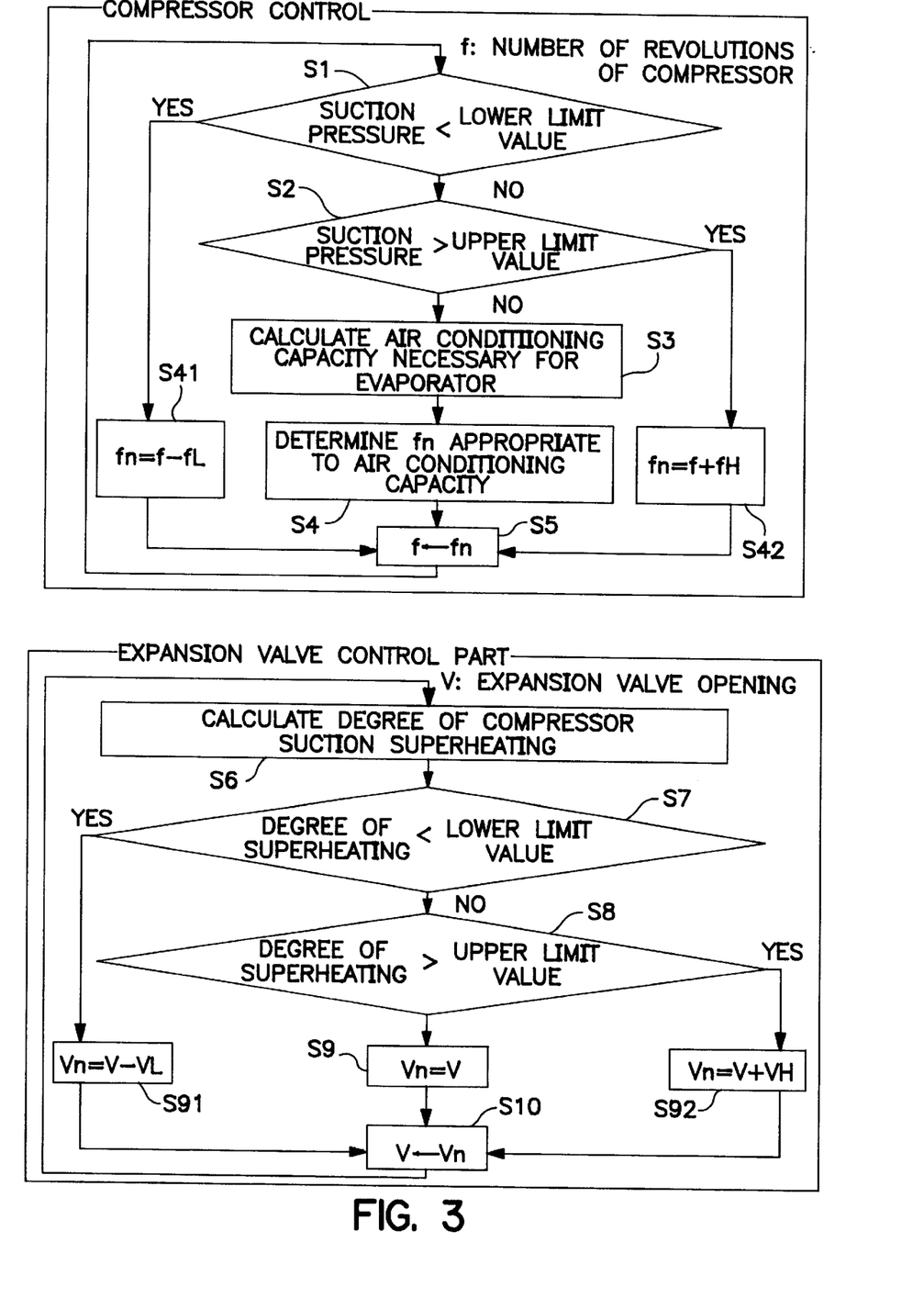
FIG. 3 is a flow chart illustrating a control method in normal operation according to one embodiment of the present invention.

FIG. 3 is a flow chart illustrating a control method when the above-described refrigeration cycle of air conditioning system is operated in normal air conditioning mode using the evaporator 7 as a cooling unit. The illustrated control method is divided into a compressor control part for controlling the number of revolutions of the compressor 2 and an expansion valve control part for controlling the opening of the expansion valve 6 as a throttling device.

In FIG. 3, the compressor control part limits the number of revolutions of the compressor 2 so that the suction pressure of the compressor 2, i.e., the output value of the pressure sensor 10 mounted near the accumulator 9, is maintained within a normal operating range to protect the compressor 2. When the suction pressure of the compressor 2 drops below the lower limit value of the normal operating range (step 1), the number of revolutions is reduced by a predetermined value fL (steps S41, S5), and when the suction pressure exceeds the upper limit value of the normal operating range (step 2), the number of revolutions is increased by a predetermined value fH (steps S42, S5). When the suction pressure of the compressor 2 lies within the normal operating range, the control unit 12 calculates the air conditioning capacity necessary for the evaporator 7 on the basis of the difference between the temperature set on a temperature setting unit (not shown) that sets the desired temperature in the air conditioned space where the evaporator 7 is placed and the temperature detected by a temperature sensor (not shown) that detects the temperature of the air conditioned space (step S3), and determines the number of revolutions for the compressor 2 through the inverter I (steps S4, S5). Here, the normal operating range for the suction pressure of the compressor 2 is set to such a range that the refrigerant stays only in vapor phase throughout the expected temperature range of the refrigerant in the line leading from the outlet of the evaporator 7 to the suction port of the compressor 2.

On the other hand, the expansion valve control part controls the opening of the expansion valve 6 so that the degree of superheating (indicating how many degrees higher the temperature of the target vapor is than the saturation temperature corresponding to the saturation pressure), which represents the difference in temperature between the saturation temperature calculated from the output value of the pressure sensor 10 mounted near the accumulator 9 and the temperature indicated by the output value of the temperature sensor 11, is held within a proper range in order to realize energy saving operation of the compressor 2. More specifically, when the degree of superheating drops below the lower limit value of the proper range (steps S6, S7), the opening of the expansion valve 6 is reduced by a predetermined value VL (steps S91, S10), and when the degree of superheating exceeds the upper limit value of the proper range (steps S6, S8), the opening is increased by a predetermined value VH (steps S92, S10). Generally, the proper range of the degree of superheating in cooling operation is set so as to have a lower limit at about 5 K (Kelvin) to prevent the refrigerant from being drawn into the compressor in a liquid state, and the upper limit value of the degree of superheating is set so as to ensure efficient operation.

In the refrigeration cycle of air conditioning system shown in FIG. 2, when the control method of normal air conditioning operation shown in FIG. 3 is employed, R32/R125 refrigerant mixture is drawn into the compressor 2 where it is compressed, and the compressed refrigerant is then introduced into the condenser 3 where it condenses to a liquid. The expansion valve 6 reduces the pressure of the evaporator 7 below a specified pressure, and the liquid refrigerant is vaporized as it passes through the evaporator 7. The heat is removed from the evaporator 7, and the temperature drops below the critical decomposition point below which the formation of a clathrate can occur. R32/R125 refrigerant mixture acts as guest molecules in the clathrate formed from the small amount of water circulating with the refrigerant, and the formation of a clathrate should occur as the refrigerant passes through the line from the inlet of the evaporator 7 to the suction port of the compressor 2, where the temperature is 0° C. or higher. The clathrate formation is most likely to occur in the line from the outlet of the evaporator 7 to the suction line of the compressor 2, where the vaporized refrigerant tends to be superheated. If an unwanted clathrate is formed, the outlet of the expansion valve 6, the evaporator 7, and the suction line of the compressor 2 will freeze. In particular, if the small oil return port 8 provided on the accumulator 9 is frozen, the oil will not circulate into the compressor 2, and reliability will be seriously affected.

However, in the embodiment shown in FIG. 2, the formation of such a clathrate is suppressed because the dryer 5 filled with the synthetic zeolite 4 or the like is placed between the condenser 3 and the expansion valve 6 and acts to remove the small amount of water contained in the refrigeration cycle. More specifically, the small amount of water is removed by adsorption in the dryer 5, and the water is reduced to an amount not sufficient to form a clathrate. In this way, freezing is prevented.

Accordingly, when 50/50 weight percent of R32/R125 refrigerant mixture (R410A) is used as the refrigerant, and when the vapor pressure is 0.807 MPa (at this time, the saturated liquid temperature is 0° C.), for example, the formation of a clathrate can be prevented from occurring in the line from the outlet of the evaporator 7 to the suction line of the compressor 2 where the vaporized refrigerant tends to be superheated, even when the degree of compressor suction superheating is controlled at or below +15 K.

In the refrigeration cycle air conditioning system of FIG. 2, the water circulating with the refrigerant can be removed by the dryer 5, as described above. There remains, however, a possibility that a clathrate may be formed before the amount of the water circulating with the refrigerant is reduced below the minimum necessary for the formation of a clathrate, that is, before the water is sufficiently removed by the dryer 5. Once the clathrate is formed, the water will remain in a clathrated state and will not contact the dryer acting as the water removing means, making it very difficult to remove the water. The embodiment hereinafter described is devised to address this problem.

Figure 4:
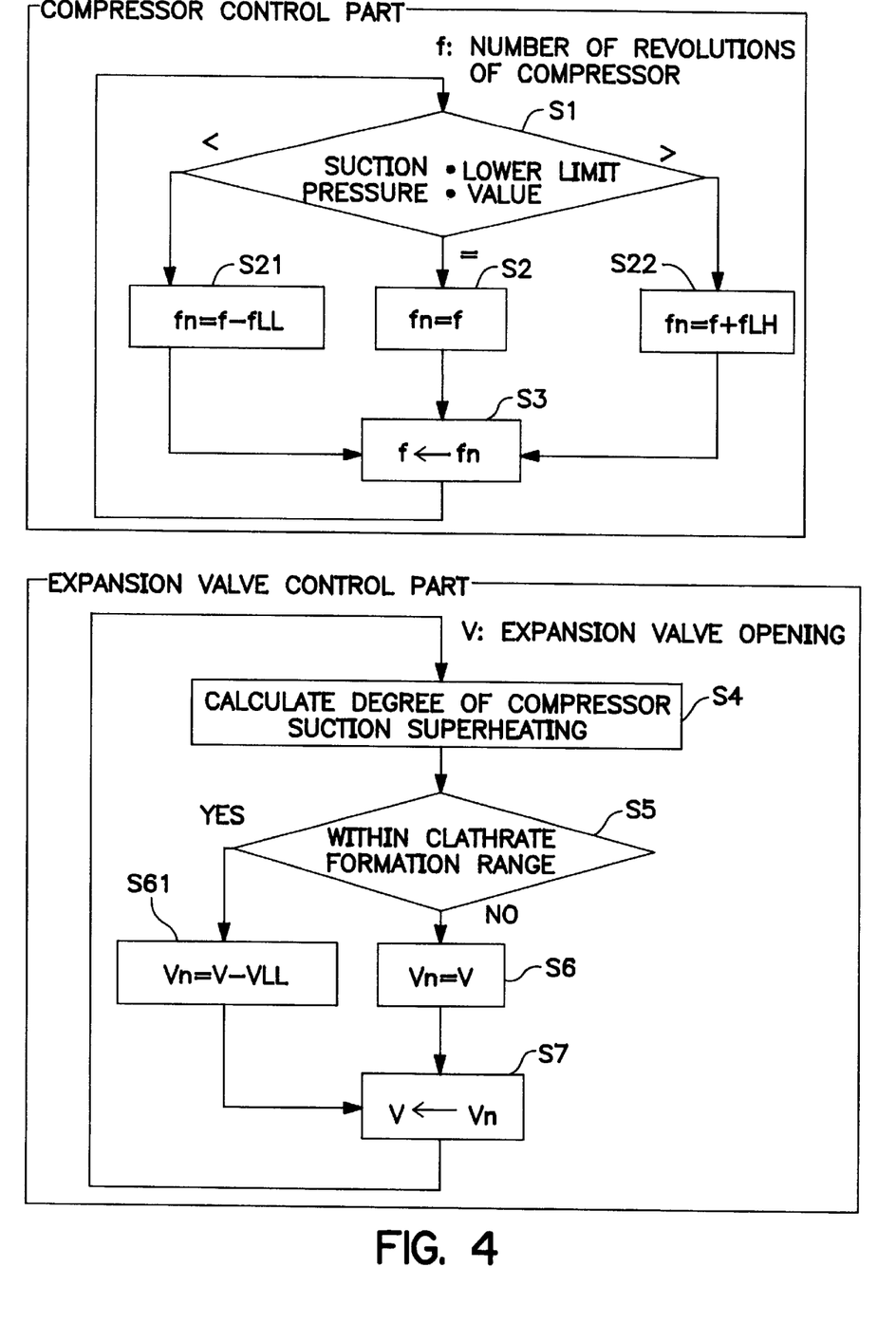
FIG. 4 is a flow chart illustrating a control method in test operation according to one embodiment of the present invention.

FIG. 4 is a flow chart illustrating a method (a third control mode) different from the normal control method shown in the flow chart of FIG. 3. This embodiment employs a control method capable of switching between two modes in the refrigeration cycle of air conditioning system of FIG. 2, i.e., between the third control mode shown in FIG. 4, as a test operation control mode for water removal, and the first control mode shown in FIG. 3, as a normal air conditioning operation control mode. The details of the normal air conditioning operation control mode in this embodiment are the same as those of the above described control method employed when the evaporator 7 is used as a cooling unit in the normal air conditioning operation mode; therefore, the description thereof is omitted here.

In this embodiment, the third control mode shown in FIG. 4 is used as the test operation control mode, which is divided into a compressor control part for controlling the number of revolutions of the compressor 2 and an expansion valve control part f or controlling the opening of the expansion valve 6.

The compressor control part performs control so that the suction pressure of the compressor 2, i.e., the output value of the pressure sensor 10, is maintained at the lower limit value of the pressure within the normal operating range of the refrigeration cycle. In this way, the compressor 2 is operated at the maximum number of revolutions within the normal operating range, and the velocity of the refrigerant circulating through the refrigeration cycle becomes the highest within the normal operating range, thus enabling the dryer 5 to remove the moisture as quick as possible. More specifically, when the compressor suction pressure drops below the lower limit value of the normal operating range (step S1), the number of revolutions is reduced by a predetermined value fLL (steps S21, S3), and when the suction pressure exceeds the lower limit value of the normal operating range (step S1), the number of revolutions is increased by a predetermined value fLH (steps S22, S3). When the suction pressure is equal to the lower limit value of the normal operating range (step S1), the present number of revolutions is maintained (steps S2, S3). Here, as described in connection with the control method in normal air conditioning operation shown in FIG. 3, the normal operating range for the suction pressure of the compressor 2 in cooling operation is set to such a range that the refrigerant stays only in vapor phase throughout the expected temperature range of the refrigerant in the line leading from the outlet of the evaporator 7 to the suction port of the compressor 2. That is, the normal operating range is set so that it lies below the saturated liquid pressure line shown in FIG. 1.

In the third control mode, the expansion valve control part controls the opening of the expansion valve 6 so that the degree of superheating, which represents the difference temperature between the saturation temperature calculated from the output value of the pressure sensor 10 and the temperature indicated by the output value of the temperature sensor 11, is maintained above the limit below which the formation of a clathrate occurs. This prevents the line leading from the outlet of the evaporator 7 to the suction port of the compressor 2, especially, the small oil return port 8 provided on the accumulator 9, from freezing. More specifically, when the degree of superheating decreases and the temperature and pressure near the accumulator 9 is about to enter the clathrate formation range (the hatched area in FIG. 1) (steps S4, S5) the opening of the expansion valve 6 is reduced by a predetermined value VLL (steps S61, S7). When the temperature and pressure near the accumulator 9 is outside the clathrate formation range (steps S4, S5), the present opening of the expansion valve 6 is maintained (steps S6, S7).

When 50/50 weight percent of R32/R125 refrigerant mixture (R410A) is used as the refrigerant, the pressure versus temperature relationship of the refrigerant in the line from the outlet of the evaporator 7 to the suction port of the compressor 2 is prevented from entering the hatched area in FIG. 1, and at the same time, the pressure is controlled at the lower limit value of the normal operating range of the suction pressure of the refrigeration cycle. For example, when the lower limit value of the normal operating range of the suction pressure is set at 0.806 MPa (at this time, the saturated liquid temperature is 0° C.), the compressor suction temperature is controlled so that the degree of compressor suction superheating is maintained at about +15 K and above.

In this way, in the test operation control mode, control is performed in accordance with the flow chart of FIG. 4, and the pressure and temperature near the small oil return port 8 provided on the accumulator 9 is prevented from entering the clathrate formation range. Accordingly, the small oil return port 8 provided on the accumulator 9 does not freeze, and the small amount of water is quickly removed by adsorption on the synthetic zeolite 4 in the dryer 5.

In this condition, after removing an adequate amount of water by adsorption, when the control mode is switched to the first control mode of FIG. 3 to enter the normal air conditioning operation control mode, the refrigeration cycle still contains a small amount of water but freezing can be prevented since more than a certain amount of water is necessary for the formation of a clathrate.

The water thus reduced in amount continues to be removed by adsorption on the synthetic zeolite 4 in the dryer 5. That is, in the normal air conditioning operation control mode, the water further reduced in amount continues to be removed by adsorption on the synthetic zeolite 4 in the dryer 5. As a result, even when the pressure and temperature near the small oil return port 8 provided on the accumulator 9 enters the clathrate formation range, the small oil return port 8 provided on the accumulator 9 does not freeze, because more than a certain amount of water is necessary for the formation of a clathrate.

More specifically, in the normal air conditioning control mode, when 50/50 weight percent of R32/R125 refrigerant mixture (R410A) is used as the refrigerant, for example, and when the suction pressure is 0. 806 MPa (at this time, the saturated liquid temperature is 0° C.) and the degree of compressor suction superheating is controlled at about +15 K and below, the pressure versus temperature relationship of the refrigerant in the line from the outlet of the evaporator 7 to the suction port of the compressor 2 falls within the clathrate formation range. Because the amount of the water present in that line is not, however, sufficient for the formation of a clathrate as the result of test operation, freezing can be avoided.

In the above embodiment, means for controlling the pressure versus temperature relationship according to the present invention has been described as controlling the degree of superheating, which represents the difference temperature between the saturation temperature calculated from the output value of the pressure sensor 10 and the temperature indicated by the output value of the temperature sensor 11, by adjusting the opening of the expansion valve 6 while the compressor 2 is being operated at the number of revolutions that falls within a predetermined range.

However, the invention is not limited to this specific means, but other means may be used. For example, if a temperature sensor (not shown) is installed at some point between the inlet of the evaporator 7 and a halfway point through it where the refrigerant can be in both the liquid and vapor phase, and such a temperature sensor is used instead of the pressure sensor 10, the saturation temperature of the refrigerant can be measured directly. Further, rather than controlling the degree of superheating, means may be provided that directly controls the absolute value of the output value of the temperature sensor 11 mounted near the accumulator 9. The only requirement here is that the pressure and temperature in the line from the outlet of the evaporator 7 to the suction port of the compressor 2 be controlled within the preset range.

In the above-described embodiment, "the range where no clathrates are formed and the refrigerant in the line from the evaporator outlet to the compressor suction port stays only in vapor phase" according to the present invention has been described as being outside the hatched area shown in FIG. 1, but the range may be further restricted as long as the range is outside the hatched area. For example, the range may be restricted to the area to the right of the semi-dashed line M in FIG. 1. That is, in the case where the absolute value of the output value of the temperature sensor 11 mounted near the accumulator 9 is directly controlled instead of controlling the degree of superheating, control may be performed in such a manner as to maintain the absolute value at or above the temperature of the clathrate critical decomposition point.

Further, the above embodiment has been described ,as performing control in accordance with the test operation control mode in such a manner that the suction pressure of the compressor 2 is maintained at the lower limit value of the pressure within the normal operating range of the refrigeration cycle so that the dryer 5 can remove moisture as quickly as possible. However, the third control mode of the present invention is not limited in application to the test operation control mode, but it can also be applied to the so-called normal operation in the presence of humans. In such cases, because it is required to satisfy the basic performance of the refrigeration cycle of air conditioning system as an air conditioning unit rather than the emergency of moisture removal, the compressor control part described above is adapted to perform the same compressor control as in the normal air conditioning control mode, instead of controlling the suction pressure at its lower limit value.

In the above embodiment, the refrigeration cycle of the present invention has been described as being the refrigeration cycle of air conditioning system shown FIG. 2, but the invention is not limited to the illustrated system but is also applicable to other refrigeration cycle. For example, a four-way valve may be inserted in the refrigeration cycle of FIG. 2 to construct a heating and cooling system having an indoor heat exchanger and an outdoor heat exchanger. The system may also be constructed as a multiple-type heating and cooling system using a plurality of indoor heat exchangers. Further, the number of expansion valves is not limited to one, but more than one expansion valve may be used to control the degree of superheating in conjunction with other valves installed in the refrigeration cycle.

In particular, when the system is constructed as a heating and cooling system having an indoor heat exchanger and an outdoor heat exchanger by inserting a four-way valve in the refrigeration cycle of FIG. 2, generally the evaporation temperature is higher and the degree of superheating is greater in cooling operation than in heating operation in the normal operation control mode. Therefore, in cooling operation, it becomes easier to avoid entering the clathrate formation range, and also the difference in refrigerant pressure and temperature becomes smaller between the test operation control mode and the normal operation control mode, making moisture removal possible without causing unnaturalness due to air conditioning load. It is therefore preferable that the above-described test control mode is carried out when running the system in cooling operation mode.

Further, the dryer 5 in FIG. 2 is located between the condenser and the throttling device where the liquid refrigerant flows at slow speed. This ensures quick removal of moisture and prevents damage to the synthetic zeolite 4, etc. In particular, when the system is constructed as a heating and cooling system having an indoor heat exchanger and an outdoor heat exchanger by inserting a four-way valve in the refrigeration cycle of FIG. 2, it is preferable that the throttling devices provided at the indoor and outdoor sides are made switchable, and that the dryer is placed at a position located between the two throttling devices and through which the liquid refrigerant passes in both cooling and heating modes.

It should, however, be noted that the location of the dryer is not necessarily restricted to a position between the condenser and the throttling device. Since the major objective of the present invention is to prevent freezing of the oil return port of the accumulator, the dryer may be disposed within the accumulator where an excessive amount of liquid refrigerant tends to dwell.

In particular, when the system is constructed as a heating and cooling system having an indoor heat exchanger and an outdoor heat exchanger by inserting a four-way valve in the refrigeration cycle of FIG. 2, generally an excessive amount of liquid refrigerant tends to dwell within the accumulator more easily in heating operation than in cooling operation in the normal operation control mode, making it difficult to avoid entering the clathrate formation range in heating operation. More specifically, the proper range for the degree of superheating in heating operation is generally set so as to have a lower limit at about 0 K (Kelvin) to ensure that the refrigerant is not drawn into the compressor in liquid phase and an upper limit at about 5 K to ensure efficient operation. Therefore, in the heating operation mode, it is preferable not to carry out the test operation control mode but to remove moisture by the normal operation control alone.

Figure 5:
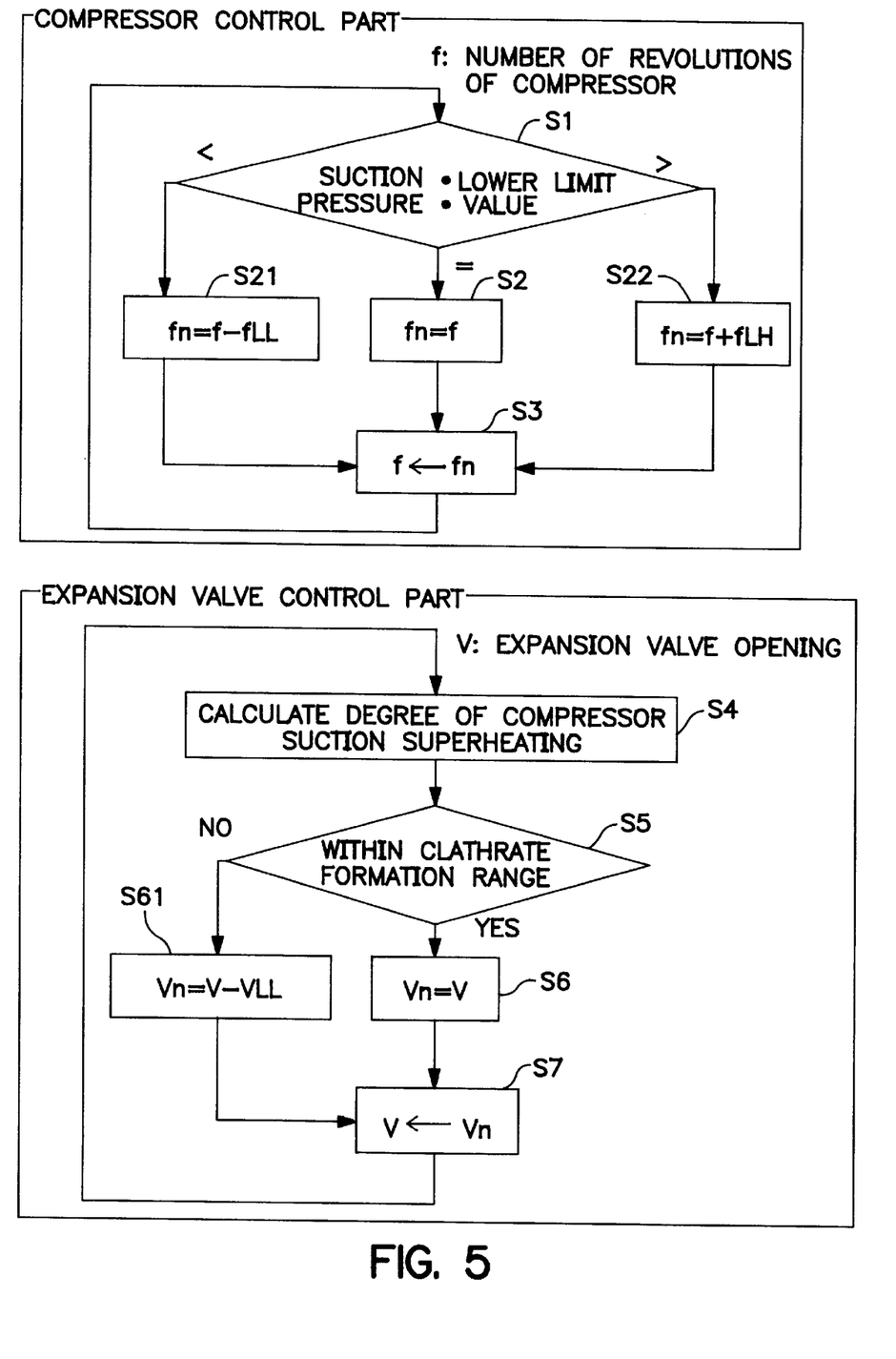
FIG. 5 is a flow chart illustrating a control method in normal operation according to one embodiment of the present invention.

The invention also may use a refrigerant mixture consisting of two kinds of refrigerants, i.e., 45 to 55 weight percent of R32 and 55 to 45 weight percent of R125. The system may be run in a second control mode in which the temperature and pressure in the line leading from the inlet of the evaporator 7 to the suction port of the compressor 2 is controlled below a specific temperature and pressure point corresponding to the critical decomposition point of a clathrate that contains water as a host solution and the refrigerant mixture as guest molecules. Here, the system may be run within a prescribed control range bounded by the clathrate formation limit line and the saturated liquid pressure line representing the pressure versus temperature relationship of saturated liquid of the refrigerant mixture. Of course, a dryer for moisture removal is also provided. FIG. 5 is a flow chart illustrating the operation in this control mode. Explanation of the same portions as those in the flow chart of FIG. 4 will be omitted. The difference is in the expansion valve control part.

The expansion valve control part controls the opening of the expansion valve 6 so that the degree of superheating, which represents the difference in temperature between the saturation temperature calculated from the output value of the pressure sensor 10 and the temperature indicated by the output value of the temperature sensor 11, is maintained within such a range as to allow the formation of a clathrate. More specifically, when the degree of superheating increases and the temperature and pressure near the accumulator 9 is about to depart from the clathrate formation range (the hatched area in FIG. 1) (steps S4, S5), the opening of the expansion valve 6 is increased by a predetermined value VLL (steps S61, S7). When the temperature and pressure near the accumulator 9 is inside the clathrate formation range (steps S4, S5), the present opening of the expansion valve 6 is maintained (steps S6, S7).

In this case, the formation of a clathrate can of course occur; however, the clathrate formation can be prevented by the provision of the dryer 5, and control is performed giving priority to the basic performance of the refrigeration cycle of air conditioning system as an air conditioning unit.

As is apparent from the above description, according to the present invention, since water that acts as the host solution is removed by adsorption, the formation of a clathrate can be prevented and eliminated.

What is claimed is:

1. A refrigeration or air conditioning system comprising a refrigeration cycle that uses a refrigerant mixture of at least two kinds of refrigerants consisting of 45 to 55 weight percent of R32 and 55 to 45 weight percent of R125, and that includes at least a compressor, a condenser, a throttling device, and an evaporator, wherein in some cases temperature and pressure in a line leading from an inlet of said evaporator to a suction port of said compressor is controlled below a specific temperature and pressure point corresponding to the critical decomposition point of a clathrate that contains water as a host solution and said refrigerant mixture as guest molecules, and within a prescribed control range bounded by a formation limit line of said clathrate and a saturated liquid pressure line representing the pressure versus temperature relationship of saturated liquid of said refrigerant mixture, and a dryer for moisture removal is provided in said refrigeration cycle.

2. A refrigeration or air conditioning system comprising a refrigeration cycle that uses a refrigerant mixture of at least two kinds of refrigerants consisting of 45 to 55 weight percent of R32 and 55 to 45 weight percent of R125, and that includes at least a compressor, a condenser, a throttling device, and an evaporator, wherein temperature and pressure in a line leading from an inlet of said evaporator to a suction port of said compressor is controlled below a specific temperature and pressure point corresponding to the critical decomposition point of a clathrate that contains water as a host solution and said refrigerant mixture as guest molecules, and within a prescribed control range bounded by a formation limit line of said clathrate and a saturated liquid pressure line representing the pressure versus temperature relationship of saturated liquid of said refrigerant mixture, and a dryer for moisture removal is provided in said refrigeration cycle.

3. A refrigeration or air conditioning system according to claim 1 or 2, wherein in a coordinate plane plotting a refrigerant pressure versus temperature relationship, with a vertical axis representing the refrigerant pressure plotted on a logarithmic scale and a horizontal axis representing the refrigerant temperature, said prescribed range is a range bounded at right by said clathrate formation limit line which is a straight line, and bounded above by said saturated liquid pressure line which is a straight line.

4. A refrigeration or air conditioning system according to claim 3, wherein the clathrate critical decomposition point of said refrigerant mixture is at a point where the temperature is 19.76° C. and the pressure is 1.430 MPa, which corresponds to the clathrate critical decomposition point of 50/50 weight percent of R32/R125 refrigerant mixture, and in said coordinate plane, said prescribed range is a range bounded by the saturated liquid pressure line of said 50/50 weight percent of R32/R125 refrigerant mixture and a clathrate formation limit line approximated by a straight line passing through said critical decomposition point and a point where the temperature is 5.16° C. and the pressure is 0.255 MPa.

5. A refrigeration or air conditioning system according to claim 1 or 2, wherein the temperature and pressure in the line leading from the inlet of said evaporator to the suction port of said compressor are a temperature and pressure near an accumulator having an oil return port and installed in a line leading from an outlet of said evaporator to the suction port of said compressor.

6. A refrigeration or air conditioning system according to claim 1 or 2, wherein said dryer is placed at a position through which said refrigerant in liquid phase passes.

7. A refrigeration or air conditioning system according to claim 6, wherein said refrigeration or air conditioning system is a heating and cooling system equipped with a four-way valve and having an indoor heat exchanger and an outdoor heat exchanger, with two throttling devices provided at the indoor and outdoor sides, respectively, said two throttle valves being switchable, and wherein said dryer is located at a position between said two throttling devices and through which said refrigerant in liquid phase passes in both heating and cooling operation modes.

8. A refrigeration or air conditioning system according to claim 1 or 2, wherein an accumulator having an oil return port is installed in a line leading from an outlet of said evaporator to the suction port of said compressor, and said dryer is disposed within said accumulator.

9. A refrigeration or air conditioning system according to claim 1 or 2, having in addition to said first or said second control mode a third control mode in which the temperature and pressure in a line leading from an outlet of said evaporator to the suction port of said compressor are together controlled so that the clathrate, containing water as said host solution and said refrigerant mixture as said guest molecules, is not formed, and so that the refrigerant stays only in vapor phase throughout said line.

10. A refrigeration or air conditioning system according to claim 9, wherein in a coordinate plane plotting the pressure versus temperature relationship of said refrigerant, with a vertical axis representing the refrigerant pressure plotted on a logarithmic scale and a horizontal axis representing the refrigerant temperature, the temperature and pressure of said refrigerant in the line leading from the outlet of said evaporator to the suction port of said compressor is controlled in said third control mode so that said temperature and said pressure both lie to the right of said clathrate formation limit line which is a straight line and below the saturated liquid pressure line which is a straight line representing the pressure and temperature relationship of saturated liquid of said refrigerant mixture.

11. A refrigeration or air conditioning system according to claim 10, wherein said refrigerant mixture is a mixture consisting of 45 to 55 weight percent of R32 and 55 to 45 weight percent of R125, and said clathrate formation limit line is a straight line passing through a coordinate point where the temperature is 5.16° C. and the pressure is 0.255 MPa and a coordinate point where the temperature is 19.76° C. and the pressure is 1.430 MPa.

12. A refrigeration or air conditioning system according to claim 9, wherein the temperature and pressure in the line leading from the inlet of said evaporator to the suction port of said compressor are a temperature and pressure near an accumulator having an oil return port and installed in the line leading from the outlet of said evaporator to the suction port of said compressor, and in said third control mode, said temperature and pressure is controlled within a range where the clathrate, containing water as the host solution and the refrigerant as the guest molecules, is not formed and where the refrigerant in said line stays only in vapor phase.

13. A refrigeration or air conditioning system according to claim 12, wherein the pressure and temperature near said accumulator is controlled using directly the absolute value of an output value of a temperature sensor provided near said accumulator or using the degree of superheating calculated from a difference relative to saturation temperature.

14. A refrigeration or air conditioning system according to claim 9, wherein said throttling device is an expansion valve capable of varying the opening thereof, and in said third control mode, control is performed by varying the opening of said expansion valve.

15. A refrigeration or air conditioning system according to claim 9, wherein said compressor is a compressor capable of varying the number of revolutions thereof, and in said third control mode, control is performed by varying the number of revolutions of said compressor.

16. A refrigeration or air conditioning system according to claim 9, wherein said throttling device is an expansion valve capable of varying the opening thereof and said compressor is a compressor capable of varying the number of revolutions thereof, and in said third control mode, control is performed by varying both the opening of said expansion valve and the number of revolutions of said compressor.

17. A refrigeration or air conditioning system according to claim 9, wherein in said third control mode the pressure in the line leading from the outlet of said evaporator to the suction port of said compressor is controlled at a predetermined lower limit value.

18. A refrigeration or air conditioning system according to claim 9, wherein the control mode is switchable between said first or said second control mode and said third control mode.

19. A refrigeration or air conditioning system comprising a refrigeration cycle that uses a prescribed refrigerant, and that includes at least a compressor, a condenser, a throttling device, and an evaporator, wherein in some cases temperature and pressure in a line leading from an inlet of said evaporator to a suction port of said compressor is controlled below a specific temperature and pressure point corresponding to the critical decomposition point of a clathrate that contains water as a host solution and said refrigerant as guest molecules, and within a prescribed control range bounded by a formation limit line of said clathrate and a saturated liquid pressure line representing the pressure versus temperature relationship of saturated liquid of said refrigerant, a dryer for moisture removal is provided in said refrigeration cycle, in addition to said first control mode, a third control mode is provided in which the temperature and pressure in a line leading from an outlet of said evaporator to the suction port of said compressor are together controlled so that the clathrate, containing water as said host solution and said refrigerant as said guest molecules, is not formed, and so that the refrigerant stays only in vapor phase throughout said line, and the control mode is switchable between said first control mode and said third control mode.

20. A refrigeration or air conditioning system comprising a refrigeration cycle that uses a prescribed refrigerant, and that includes at least a compressor, a condenser, a throttling device, and an evaporator, wherein temperature and pressure in a line leading from an inlet of said evaporator to a suction port of said compressor is controlled below a specific temperature and pressure point corresponding to the critical decomposition point of a clathrate that contains water as a host solution and said refrigerant as guest molecules, and within a prescribed control range bounded by a formation limit line of said clathrate and a saturated liquid pressure line representing the pressure versus temperature relationship of saturated liquid of said refrigerant, a dryer for moisture removal is provided in said refrigeration cycle, in addition to said second control mode, a third control mode is provided in which the temperature and pressure in a line leading from an outlet of said evaporator to the suction port of said compressor are together controlled so that the clathrate, containing water as said host solution and said refrigerant as said guest molecules, is not formed, and so that the refrigerant stays only in vapor phase throughout said line, and the control mode is switchable between said second control mode and said third control mode.

21. A refrigeration or air conditioning system according to claim 19 or 20, wherein at the start of operation, said system is operated in said third control mode, after which said system is run in a normal operation mode in accordance with said first or said second control mode.

22. A refrigeration or air conditioning system according to claim 19 or 20, wherein said refrigeration or air conditioning system is a heating and cooling system equipped with a four-way valve and having an indoor heat exchanger and an outdoor heat exchanger, and the operation mode is switchable in cooling operation.

23. A refrigeration or air conditioning system according to claim 19 or 20, wherein said refrigeration or air conditioning system is a heating and cooling system equipped with a four-way valve and having an indoor heat exchanger and an outdoor heat exchanger, and in heating operation said system is operated in said first or said second control mode.

24. A refrigeration system comprising:

45 to 55 weight percent R32, and 55 to 45 weight percent R125;

a compressor;

a condenser;

a dryer;

a throttling device;

an evaporator; and at least one connection line which connects said compressor to said evaporator;

wherein the temperature and pressure in said connection line is maintained:

below the critical decomposition point of a clathrate comprising said at least two refrigerants contained as guest molecules within water; and within a prescribed control range bounded by a formation limit line of said clathrate and a saturated liquid pressure line representing the pressure versus temperature relationship of saturated liquid of said refrigerant mixture.

25. A refrigeration or air conditioning system comprising a refrigeration cycle that uses a refrigerant mixture, and includes at least a compressor, a condenser, a throttling device, and an evaporator, wherein temperature and pressure in a line leading from an inlet of said evaporator to a suction port of said compressor is controlled below a specific temperature and pressure point corresponding to the critical decomposition point of a clathrate that contains water as a host solution and said refrigerant mixture as guest molecules, and within a prescribed control range bounded by a formation limit line of said clathrate and a saturated liquid pressure line representing the pressure versus temperature relationship of saturated liquid of said refrigerant mixture, and a dryer for moisture removal is provided in said refrigeration cycle.

* * * * *

UNITED STATES PATENT AND TRADEMARK OFFICE
CERTIFICATE OF CORRECTION

PATENT NO. : 5,916,252
DATED : June 29, 1999
INVENTOR(S) : Yuji Yoshida, Mitsuharu Matsuo, Takaji Akiya, Masaru Owa, It is certified that error appears in the above-identified patent and that said Letters Patent is hereby corrected as shown below:

Cover page, item [73] add Assignee --Director-General of Agency of Industrial Science and Technology, Tokyo, Japan--

Signed and Sealed this

Fifteenth Day of August, 2000

Attest:

Q. TODD DICKINSON

*Attesting Officer*  *Director of Patents and Trademarks*